United States Patent [19]
Diem et al.

[11] Patent Number: 5,268,188
[45] Date of Patent: Dec. 7, 1993

[54] PROCESS AND DEVICE FOR FOLDING DOUGH SHEETS

[75] Inventors: Eckehard Diem; Helmut Ganster; Alfred Winter; Stefan Giokas; Edgar Walter, all of Vienna, Austria

[73] Assignee: "EMO-Marietta"-Nahrmittel-Prouduktions- und Vertriebs-Gesellschaft m.b.H., Vienna, Austria

[21] Appl. No.: 859,499

[22] PCT Filed: Oct. 30, 1990

[86] PCT No.: PCT/AT90/00106
§ 371 Date: Jun. 15, 1992
§ 102(e) Date: Jun. 15, 1992

[87] PCT Pub. No.: WO91/06218
PCT Pub. Date: May 16, 1991

[30] Foreign Application Priority Data

Oct. 30, 1989 [AT] Austria .................. 2493/89

[51] Int. Cl.⁵ .............................................. A21D 6/00
[52] U.S. Cl. .................................. 426/502; 99/450.1; 99/450.2; 426/512
[58] Field of Search .............. 426/502, 512, 391, 128; 99/450.1, 450.2

[56] References Cited

U.S. PATENT DOCUMENTS

| | | | |
|---|---|---|---|
| 4,084,493 | 4/1978 | Quintana | 99/450.7 |
| 4,520,035 | 5/1985 | Lamonica | 426/128 |
| 4,753,813 | 6/1988 | Saadia | 426/502 |
| 4,778,685 | 10/1988 | Simelunas et al. | 426/502 |

FOREIGN PATENT DOCUMENTS

| | | |
|---|---|---|
| 0089753 | 9/1983 | European Pat. Off. . |
| 1906683 | 9/1970 | Fed. Rep. of Germany . |
| 2439496 | 3/1976 | Fed. Rep. of Germany . |
| 2709544 | 9/1977 | Fed. Rep. of Germany . |
| 2754147 | 6/1978 | Fed. Rep. of Germany . |
| 3844441C1 | 3/1990 | Fed. Rep. of Germany . |
| 2515928 | 5/1983 | France . |

Primary Examiner—George Yeung
Attorney, Agent, or Firm—Nixon & Vanderhye

[57] ABSTRACT

In a process for folding dough sheets, in particular strudel dough sheets, at least one dough sheet is folded inward in opposite directions in at least two consecutive folding operations along parallel fold lines, and the exposed edges of the dough sheet that are parallel to the fold line come to lie within the projection of the folded dough sheet, after which the dough sheet folded this way is tucked on a first end along a line running crosswise to the parallel fold lines. Starting from the folded dough sheet's other end that is opposite in the direction of the parallel fold lines, tucking is performed at least twice opposite the direction of the first tuck, so that a folded edge of the product tucked at least twice comes to lie above the tucked, first end. In a device for performing this process, there is attached, to a conveying device (1), a first folding station (8) with folding flaps that can be pivoted around pins parallel to conveying direction (11), and in the conveying direction, after first folding station (8), a flap (22) that can pivot around a pin running crosswise to conveying direction (11) is attached and the conveying device comprises a transfer point to a device for multiple tucking of the exposed end of the folded dough sheet.

12 Claims, 6 Drawing Sheets

PROCESS AND DEVICE FOR FOLDING DOUGH SHEETS

The invention relates to a process for folding essentially rectangualr dough sheets, and at least one dough sheet is folded inward in opposite directions, in at least two consecutive folding operations, along parallel fold lines, and the exposed edges of the dough sheet that are parallel to the fold line come to lie within the projection of the folded dough sheet, and the inwardly folded dough sheet is tucked on the ends along lines running crosswise the to parallel fold lines, as well as to a device for performing this process.

From DE-OS 2 439 496, there became known a machine for the crosswise folding of dough strip sections in which a dough strip section for the production of flaky pastry was moved by numerous conveyor tables equipped with driven conveyor belts and, for a folding of the fed dough strip section, the conveyor belts are made with reversible drive and run partially slanted toward one another. By reversing the conveyor belt drive and varying the spacing of the guide pulleys of individual conveyor belts, a folding of the dough strip section along essentially parallel fold lines is performed. After such a folding of the dough strip section, the folded packet is again rolled out and the folding operation is repeated, since, to produce flaky pastry, a forming several times and subsequent rolling out are necessary. From DE-PS 38 44 441 there comes out another device for working a dough consisting of two dough layers and a layer of shortening in between them for flaky pastry and puff pastry, and again a dough strip section is folded along two essentially parallel fold lines and subsequently again a rolling operation takes place. From DE-OS 27 54 147 there has become known a device for readying dough parts for the oven, and a rolled-out dough part is folded along two essentially parallel fold lines and is then fed to an oven by numerous conveyor belts mutually placed in a rectangle. A similar device for folding dough within the framework of a dough forming machine also comes out from DE-OS 19 06 683.

From U.S. Pat. No. 4,520,035, a process of the above-mentioned type for packaging circular pizza crusts became known, and a packaging foil made with prefabricated fold lines is placed on the circular dough and the dough is folded in each case along pairs of fold lines running parallel to one another and mutually placed in a rectangle into a size suitable for packaging. From U.S. Pat. No. 4,084, 493 there also became known a process and a device for folding and packaging circular dough sheets with a filling, and in a first folding station, folding flaps perform a first tucking of the dough sheet, after which then another, multiple tucking of the dough sheet essentially crosswise to the conveying direction is performed by flaps that can be pivoted.

The drawback of these processes is the fact that, because of the circular starting material, the repeated folding results in areas of varying thickness because a varying number of overlapping dough lengths results.

Dough sheets of the above-mentioned type have a slight thickness achievable by rolling, pulling, or the like and can consist, for example, of strudel pastry, flaky pastry or similar dough types worked into thin dough sheets. In particular, strudel dough sheets, in addition to the conventional process method according to which such sheets were produced by manual pulling, were produced already with dough pulling machines. Such dough pulling machines for the production of strudel dough lengths exert tensions on a path crosswise to the conveying direction of the dough length, and holding devices are provided on the lateral edges of the dough lengths that grip the dough length and also keep it at the pulled width during the extensive drying. Only after reaching a certain moisture content does there subsequently exist no more danger that the dough length, after removing the gripping effect at the edges of the dough length, does not contract again. Such pulled dough lengths were subsequently cut with cutting devices to the desired format of the individual dough sheet and, after separating the 5 dough lengths cut in this way, the folding to achieve a packageable product previously had to be performed manually. The remaining moisture of the dough length is of considerable significance for storage properties, and dough lengths pulled by machine had to be brought, by drying, to a narrow range of allowable moisture since, with too little moisture, folding without the dough becoming brittle and without the ensuing cracks was no longer easily possible and with too much moisture, storage properties were clearly degraded. While retaining the moisture content, which usually was between 15 and 25% by weight, it was possible in the past to fold a product by manual folding so that also subsequently, during storage, the moisture release of the product, which could lead to cracks when unfolding the product, was able to be kept as small as possible. The known folding measures provided that all exposed edges were pushed inward by multiple, opposite folding operations, to keep excess moisture release by such edge points of the folded dough sheet as small as possible. But the previously used folding processes were not at all suited for a simple folding by machine, and the procedure for manual folding thus turned out to be time-consuming and cost-intensive.

Now the object of the invention is to provide a process of the above-mentioned type that is suited in a particularly simple way for folding by machine and with which it is simultaneously assured that no edges of the original dough length come to lie at the edges of the folded product. Especially the avoidance of such edges at the edges of the folded product subsequently leads to considerably improved storage properties and a clearly reduced moisture loss that could lead to brittleness of the dough. To achieve this object, the process according to the invention consists essentially in that the folded dough sheet, starting from the folded dough sheet's other end that is opposite the first end in the direction of the parallel fold lines, is tucked at least twice opposite the direction of the first tuck so that a folded edge of the product that has been tucked at least twice comes to lie above the tucked first end. Since inward folding is performed first in opposite directions along parallel fold lines, a process method is selected that can also be performed by machine without great structural expense. By inward folding in opposite directions along parallel fold lines it is to be assured here that the exposed edges of the dough sheet parallel to the fold line come to lie within the projection of the folded dough sheet, providing for the lateral delimitation of the folded product now by folded edges, but not by exposed edges of the original dough sheet. For this folding operation it is immaterial whether a single sheet is folded or whether, corresponding to a preferred further development, simultaneously two or more superposed dough sheets are subjected to such a first folding. In all cases namely the exposed edges of the dough sheet or sheets reach an area within the outline of the folded product or dough sheet stack. By tucking the inwardly folded dough sheet or the folded dough sheet stack on a first end along a line running crosswise to the parallel fold lines, it is now assured also on a crosswise side of the folded product that exposed edges of the original dough sheets do not come to lie outside, but rather within the outline of the folded product. Because now, at the opposite, exposed end of the folded product, this end is tucked in the opposite direction at least twice so that a folded edge of the product that has been tucked at least twice comes to lie above the tucked, first end, there results overall a product in which the visible edges are all formed of folded edges and for which only a relatively low number of consecutive folding operations is necessary, making such a process especially suited for folding dough sheets by machine.

Advantageously, the process according to the invention is performed so that the dough sheet is folded in opposite directions along two parallel fold lines toward the center section, by which an especially simple folding device can be found to be sufficient. The extremely simple course of the process here allows high production rates with mechanical fabrication without hindrance, since it must be taken into consideration anyway that the dough sheet or the stack of dough sheets to be folded all consist of extremely thin and easily deformable material.

According to a preferred further development of the process according to the invention, the procedure is such that the parallel fold lines lie at a distance from one another that is greater than or equal to the distance of the fold lines from the exposed edges of the dough sheet that are parallel to the fold line. In this way, with two consecutive folding operations in which essentially in each case about a third of the original width of the dough sheet is folded over, it is assured that the last-folded margin comes to lie at a distance from the opposite, just-folded edge within the outline of the folded product.

The multiple tucks of the end of the dough length opposite the first, tucked end makes it possible to achieve a relatively small final product, and for such a multiple tucking operation at the end of the folding operation, the procedure is advantageously selected so that the length of the tucked, first end of the folded dough sheet is shorter than or equal to the length of the tucked parts of the opposite end. A multiple tucking of the narrow side of the original folded product after the first folding operation also can be performed in an especially simple way by machine, and the last, multiple tucking operation can be performed like a rolling process at high speed without damaging the delicate product.

To assure in any case a safe and simple separation of the folded sections of the dough sheet when used, the procedure is preferably one such that the folding of the dough sheet is performed with the insertion of a separation material, in particular a separation foil, for example of parchment, paper, or the like.

The device according to the invention for performing this process is made with a first conveying device to transport dough sheets, and a first folding station with folding flaps that can be pivoted around pins parallel to the conveying direction is attached to the first conveying device, and in the conveying direction, after the first folding station, a flap is placed that can be pivoted around a pin running crosswise to the conveying direction and a device for tucking the exposed end of the folded dough sheet several times is attached to a second conveying device by a transfer point. The first folding station is operated here so that both folding flaps that can be pivoted around parallel pins are operated consecutively so that, after a first folding operation by one of the two folding flaps, after this folding flap pivots back, the second folding operation by the second folding flap can be performed. Also the first tucking operation of the folded dough sheet or folded packet that now generally forms the narrow side of the folded product can be easily performed by a flap that can pivot, after which, after the transfer point into another device, a multiple tucking or rolling of the other, exposed end of the folded dough sheet is performed, directly to achieve a folded final product. Such a device for multiple tucking of the exposed end of the folded dough sheet can be operated at high speed when the design is made such that this device is made of rods that can be driven to pivot around an axis of rotation running between the rods and parallel to them. With such a design it is sufficient to design the transfer point so that the area to be tucked several times can be grasped by the rotating rods, for which the design is advantageously made so that the transfer point of the conveying device is placed in or near the axis of rotation of the rods. The final product can be released in a simple way by pulling off the rods in the direction of their axis, by which the final product can directly reach a collecting point.

To assure a perfect folding of the delicate and extremely thin product in the first folding station, the folding is advantageously performed with a stationary dough length. For this purpose, the design according to the invention is advantageously made so that, in the area of the first folding station, an intermediate conveyor is placed whose drive can be turned off during the folding operation. If a packet consisting of several sheets is to be folded simultaneously, a design is especially advantageous in which there is placed, at the transfer point of the conveying device and on the intermediate conveyor, a device for grasping a dough sheet that can be driven at a speed exceeding the conveying speed of the conveyor. With such a device for grasping the dough sheet, a dough sheet delivered by the conveyor can be pulled off at a speed exceeding the conveying speed and conveyed to the dough sheet that is subsequently folded along parallel edges on stationary dough sheets in the first folding station.

To avoid adherence, because of the formation of a vacuum, between the folding flaps and the dough sheet, the design is advantageously made, in the area of the first folding station, such that the folding flaps of the first folding station have perforations. A similar design can of course also be selected for the folding flap for tucking the one end of the folded dough sheet or packet, but at this point, in view of the already greater weight of the section to be tucked, the danger of adherence because of the formation of a vacuum between the folding flap and the dough material is already considerably less.

To facilitate tucking the already folded dough sheet or dough sheet packet along an exactly defined edge, the design can be advantageously made so that near the pivot pin of the flap for tucking the first end of the folded dough sheet, above the conveying device, a rod is placed to move crosswise to the conveying direction.

Also during the first folding operation, in which one or more dough sheets are folded inward along parallel folded edges, the quality of the folding can be improved and the danger of defects during folding can be considerably reduced if, corresponding to a preferred further development, the design is made so that, in the area of the first folding station, a blade-shaped element that can pivot or is springy is placed above the intermediate conveyor, an element whose side edges, in the projection on the intermediate conveyor, are essentially aligned with the pivot pins of the folding flaps.

The invention is explained in more detail below based on a device for performing the process according to the invention represented diagrammatically in the drawing. In the drawing there are shown.

Figure 1:
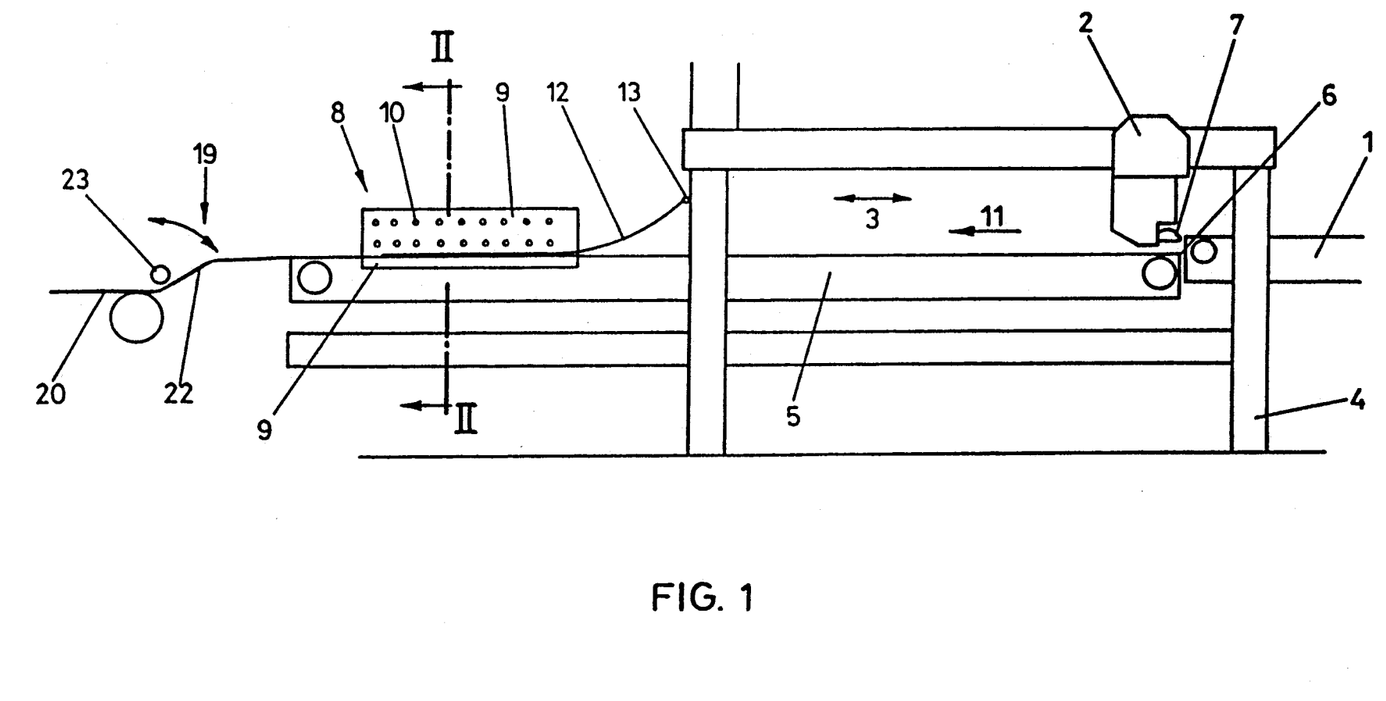
FIG. 1, a diagrammatic view of the first folding station for folding one or more dough sheets along parallel fold lines, and upstream from this first folding station there is placed a device for arranging several dough sheets above one another, FIG. 2, a cut along line II—II in FIG. 1 through the first folding station on a greatly enlarged scale, FIG. 3, a view of a device following the first folding station for tucking the one end of the folded packet and, following it, a device for tucking or rolling the folded dough sheet beginning from the other end, FIG. 4, on an enlarged scale, in detail, the device for tucking the first end of the folded dough sheet, and FIG. 5, in a likewise enlarged representation, in detail, the device for tucking or rolling the other end of the folded dough sheet, FIG. 6, a diagrammatic top view of a dough sheet, and the fold lines of the consecutive folding operations are indicated.

In FIG. 1, 1 designates a conveying device with which, essentially continuously, dough sheets cut to a predetermined size are fed from a unit not shown in more detail for pulling and drying the dough, in particular strudel dough, to the subsequent folding stations. Generally, such strudel dough sheets are not folded individually but it is usually provided for at least two superposed strudel dough sheets in each case to be folded and then packaged. For such an arrangement of at least two superposed strudel dough sheets, next there is provided, at first conveying device 1, a device 2 for grasping a dough sheet delivered by conveying device 1, and this device 2 can be moved in the direction of double arrow 3 at a diagrammatically indicated frame 4 that is also used for supporting conveying device 1 and a subsequent intermediate conveyor 5. The drive for device 2 is made here so that the device can be moved at a speed exceeding the conveying speed of conveying device 1, to assure that, after laying a first dough sheet on intermediate conveyor 5, device 2 for grasping another dough sheet is already again located at transfer point 6 between the conveyors at a moment at which the next dough sheet is conveyed from conveying device 1. To grasp the dough sheets at offset transfer point 6, here a gripping arm 7 is diagrammatically indicated. After two dough sheets, for example, are placed above one another this way, they are transferred by intermediate conveyor 5, made to be able to be turned off, to a first folding station 8 in which a first folding is performed along at least two parallel fold lines. The folding is performed here in the embodiment shown with the help of two folding flaps 9, as will be shown in more detail in FIG. 2. Here, in FIG. 1, a folding flap 9 is represented in a raised position without a dough sheet lying on it, and perforations or holes 10 in folding flap 9 are clearly visible that prevent the appearance of a vacuum and thus a partial adherence of one or more dough sheets to folding flap 9 during folding. To convey and define exact folding edges running essentially parallel to conveying direction 11, a blade-shaped element 12 is fastened to frame 4, an element that can be pivoted either around pivot point 13 to a limited extent or is made in the form of a spring element. During transport of dough sheets stacked on one another by device 2 by intermediate conveyor 5, these dough sheets are conveyed and held by element 12, and furthermore, exact fold lines are defined by element 12, as is visible in more detail with reference to FIG. 2. For an orderly folding, the drive of intermediate conveyor 5 is generally made to be able to be turned off, so that with suitable dimensioning of the distances between device 2 and the first folding station, work is generally performed so that the placement of at least two dough sheets above one another is performed simultaneously with a folding of the preceding dough sheet stack in each case when the intermediate conveyor is stopped. For a correct position of the dough sheets in first folding station 8, stops can be provided on the end of the flap. After completed folding along parallel fold lines, the folded dough sheet or the folded dough sheets reach, at a transfer point 19, subsequently a diagrammatically indicated device 22 for tucking a first end of the folded packet, as is represented in more detail in FIGS. 3 and 4.

Figure 2:
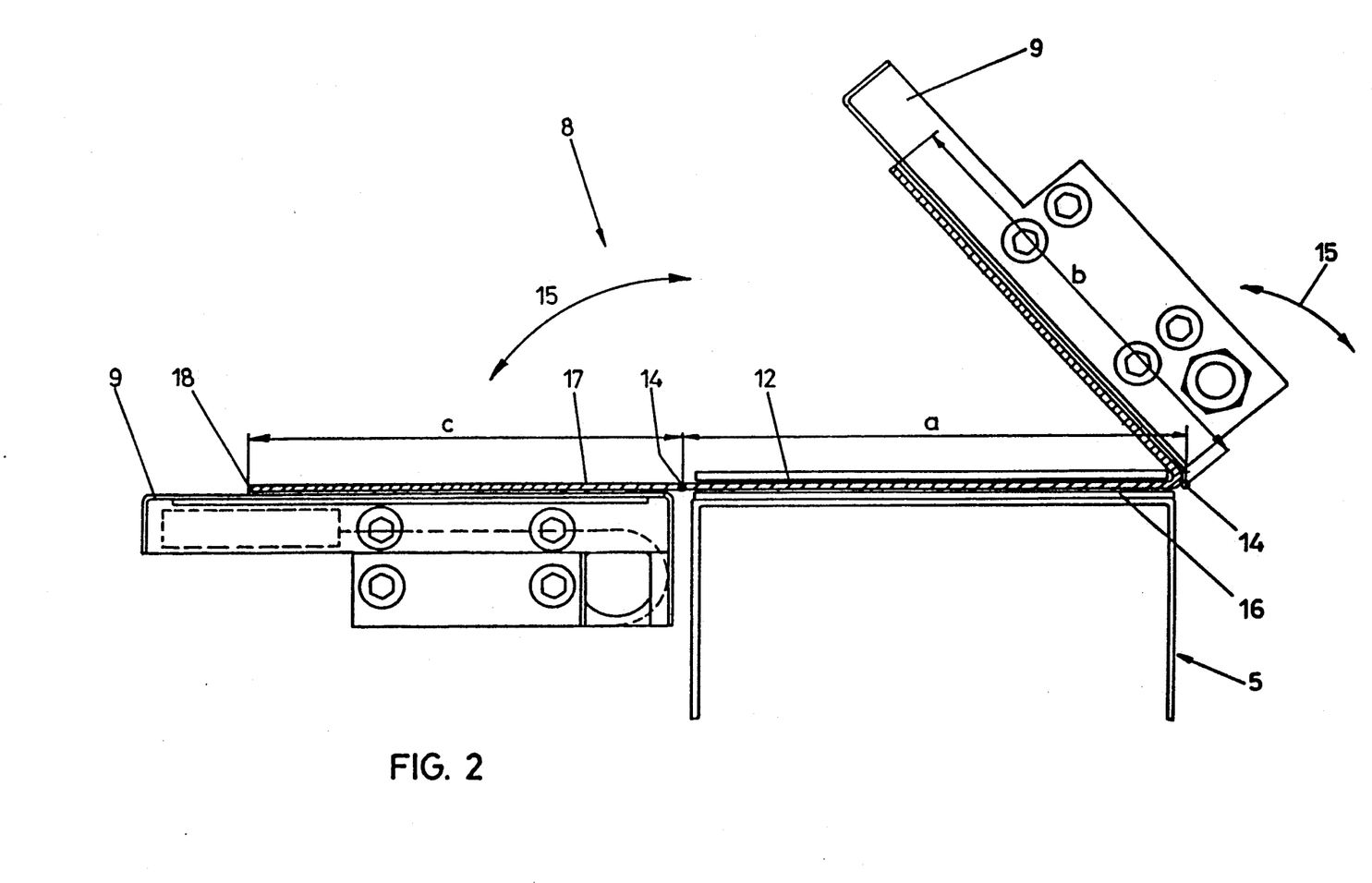

In the cut represented in FIG. 2 through the first folding station, two folding flaps 9 are clearly visible that can fold along pivot pins diagrammatically indicated by 14 in a way not represented in more detail, for example by suitable lever mechanisms, in the direction of arrow 15. Here the dough sheet lying on the conveyor belt, designated by 16, of intermediate conveyor 5 and on flaps 9 is indicated by 17. For simplicity's sake, here the dough sheet is represented as one, and it can involve, as mentioned above, two or more superposed dough sheets. The position of pins 14, whose spacing is designated by a, is selected here so that the margins of dough sheet 17 that were folded over by folding flaps 9 and whose widths are designated by b and c, are smaller than the area of the dough length that forms the base area. Width b of the folded-over first margin can be almost equal to width a here, while width c of the dough length must be dimensioned so that exposed edge 18 comes to lie within the projection of the folded dough sheet and thus within width a of the base area. For a suitable definition of the fold lines, furthermore, the width of element 12, which can be pivoted or is springy, for conveying dough length 17 is essentially equal to or only slightly less than the distance between pins 14 of the folding flap.

Figure 3:
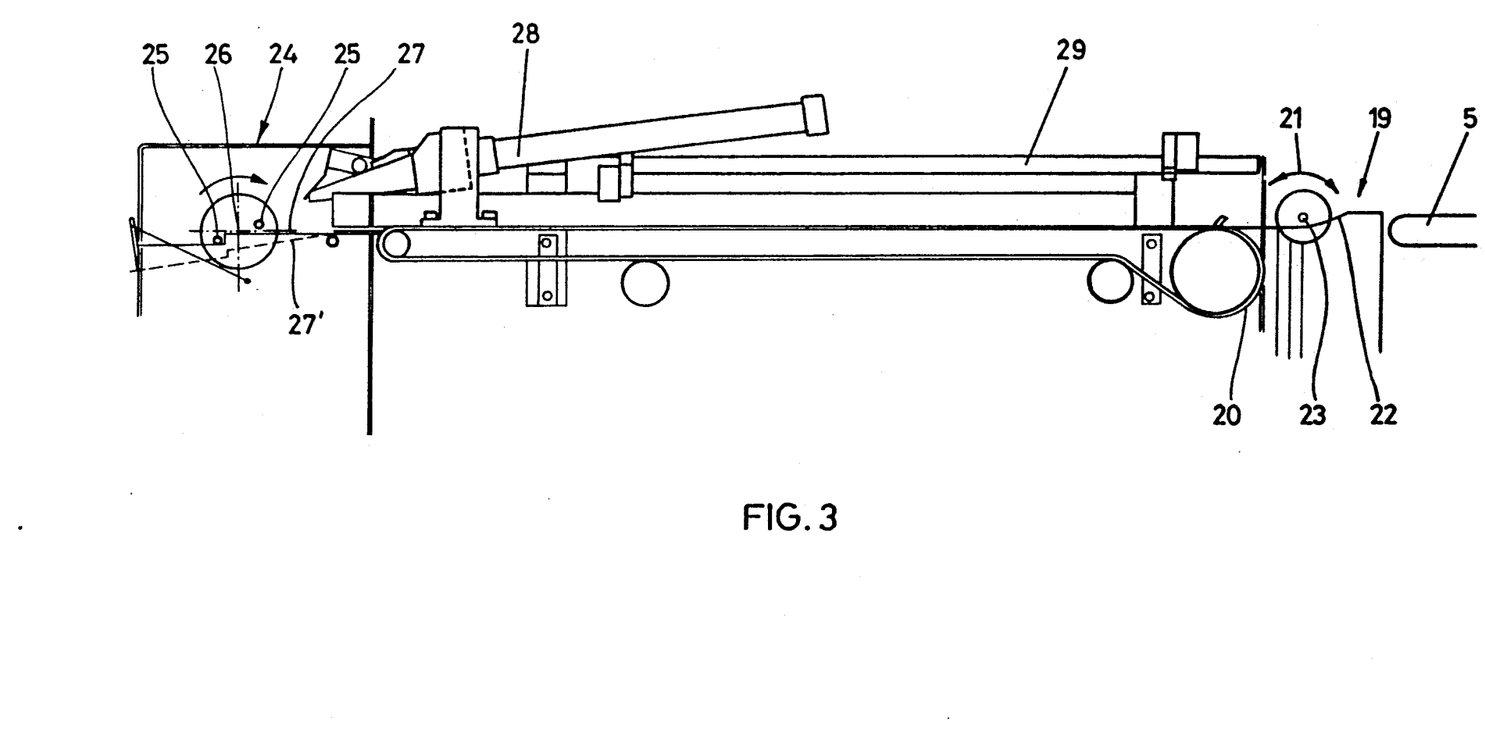

FIG. 3 shows, in more detail, the device for further tucking or rolling the dough sheet or dough sheet packet folded in the first folding station along at least two parallel fold lines. Here the folded dough sheet or dough sheet packet is transferred from conveyor 5 at a transfer point 19 to another conveying device 20 that again can be operated intermittently. In the area of transfer point 19 there is provided a flap 22 that can pivot in the direction of arrow 21 and with which, around a spindle or a rod 23, a tucking of the one end of the folded dough sheet packet crosswise to the fold lines of the first folding station is performed, as is represented more precisely in FIG. 4.

After such a tucking of the one end, the dough sheet packet is fed by conveying device 20 to a rolling device 24, and, beginning at the end of the dough sheet opposite the end that was first tucked in, a multiple tucking or rolling is performed around rods 25, which are mounted to rotate around an axis 26. The transfer point is formed here by a table or support 27 that can pivot, as is explained in more detail in FIG. 5. After performing a tucking or rolling at least twice in the area of this end, after completion of the rolling or tucking operation, rods 25 are pulled off parallel to the axis of rotation, after which, with the help of a diagrammatically indicated pusher device 28, the folded packet formed is fed to a collecting point not shown in more detail. The frame of support or conveying device 20, and rolling station 24 and the device for tucking the first end, is indicated by 29 here.

Figure 4:
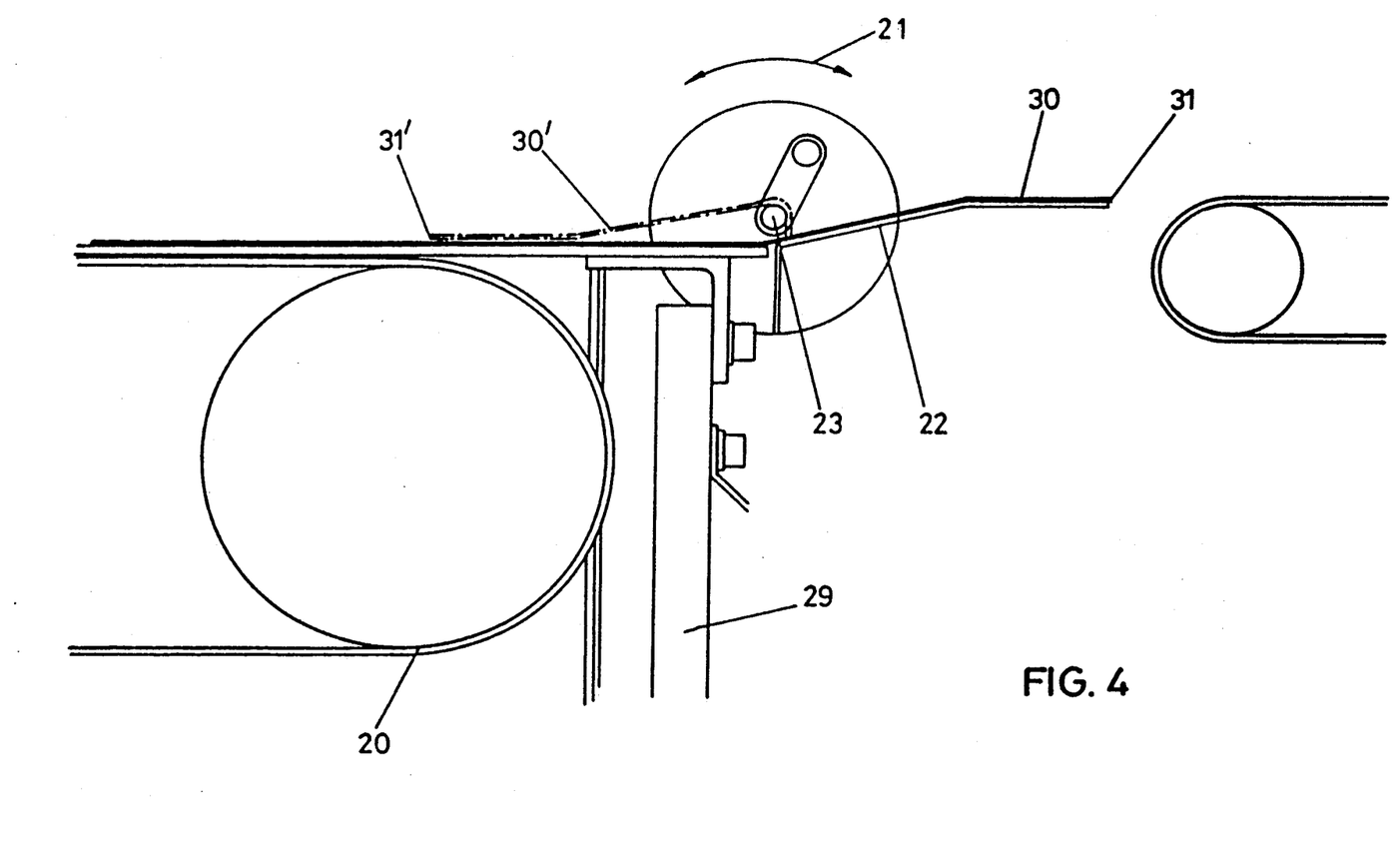

FIG. 4 shows in detail flap 22 that can pivot for tucking the first end of the folded dough sheet or dough sheet packet, which is now designated by 30. By suitable sensors not shown in more detail, for example photoelectric barriers, conveyor belt 20 is stopped on frame 29 in a suitable position of folded packet 30 and, by raising flap 22 in the direction of arrow 21, the one end of the folded dough sheet or dough sheet packet is folded around rod or spindle 23 so that this end reaches position 30', designated by dashed lines. In this way it is assured that edge 31 of the folded packet again comes to lie within the base area, after it has already been taken care of in the first folding station that edge 18 of the dough sheet, pushed inward during folding with the second flap, lies within the base area. Just like after folding in the first folding station, the outside edges of the folded packet are formed by folded edges placed in the area of pivot pin 14, thus by tucking the first end again it is taken care of that only one folded edge is visible on the outside and not an exposed edge of the dough sheet, and the folded edge is defined by spindle 23. After folding the dough sheet into the position shown in dashed lines, the rod is pulled off so that, by starting conveyor 20, the folded dough sheet packet, tucked on one end, can be fed to rolling device 24 shown in more detail in FIG. 5.

From conveyor 20 there is performed, in the area of rolling station 24, a transfer of folded packet 30 to a transfer point made in the form of a table 27 that can pivot. The table is made with a gradation 32 whose contour essentially corresponds to the cross section of a rod 25 for tucking or rolling the folded dough sheet beginning from the end opposite the first, tucked end. After the conveyor has again been stopped by suitable sensors in the suitable position of folded packet 30, table 27 is lowered according to arrow 33 into the position designated by 27' and a tucking or rolling of dough sheet packet 30 is performed by rotation of rods 25, for example fastened on a disk 34, around axis 26 in the direction of arrow 35. In this way, the dough sheet first reaches the position indicated with dashed lines at 30', and when it is rolled or tucked as in FIG. 5, dough sheet packet 30 is folded over at least three times, so that the exposed end designated with 36 also comes to lie inside the final product. The length of the first end of folded dough sheet 3 tucked with the help of flap 22 that can pivot is selected so that it essentially corresponds to the dimensions resulting from rolling or tucking the other end. For manual packaging sizes, here generally lengths are dimensioned so that, in the rolling operation, between five and ten layers come to lie on one another. After completion of the rolling or tucking operation, rods 25 are pulled off in the direction of axis of rotation 26, after which, as mentioned above, the product made is pushed off. Instead of pulling off rods 25, a pushing off of rods 25 can also be provided.

Figure 6:
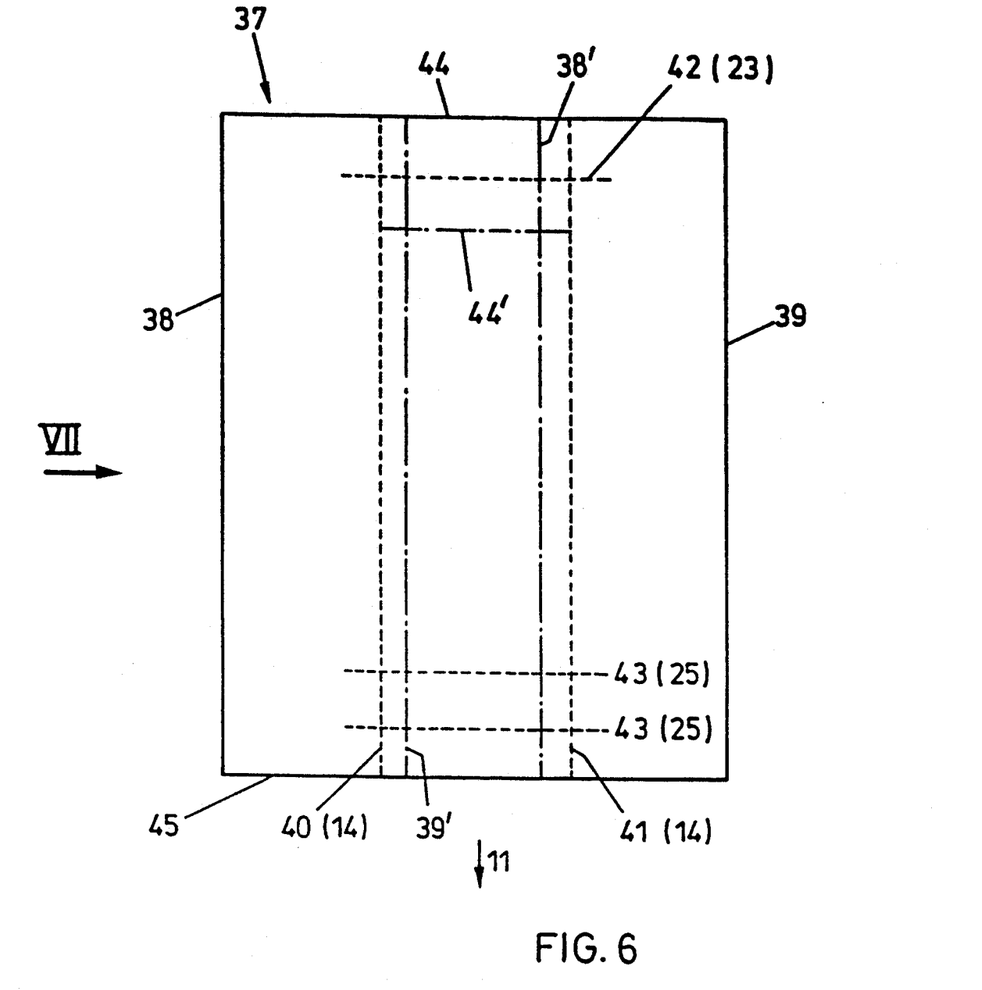

FIG. 6 shows diagrammatically an essentially rectangular dough sheet 37 with side edges 38 and 39 parallel to the direction of movement designated by 11. In the first folding station, here a first fold of the section delimited by side edge 38 is performed along a fold line 40 indicated in dashed lines, which is defined essentially by pin 14, represented in FIG. 2, of first folding flap 9. After this first folding operation, side edge 38 reaches the position indicated in dot-dash lines. Subsequently, also in the first folding station shown in more detail in FIG. 2, the area delimited by side edge 39 is folded over around a second fold line 41 parallel to first fold line 40, and also this fold line 41 is again defined by pivot pin 14 of the second folding flap seen in FIG. 2; after this second folding, side edge 39 reaches the position represented at 39' in dot-dash lines and after these first two folding operations there results a dough sheet 37 folded to about one-third its original width and which, viewed in direction of movement 11, is now delimited by fold lines 40 and 41. It comes out from FIG. 6 clearly that side edges 38 and 39, originally lying on the outside, come to lie within the projection of the folded dough sheet within the outline delimited by fold lines 40 and 41.

After leaving the first folding station, the folded dough packet reaches the area of flap 22 that can pivot, shown in more detail in FIG. 4, and a tucking of rear end 44, viewed in direction of movement 11, is performed around fold line 42, indicated in dashed lines and defined by spindle 23. After folding with the help of flap 22, exposed end 44 reaches the position indicated at 44' in dot-dash lines.

Figure 5:
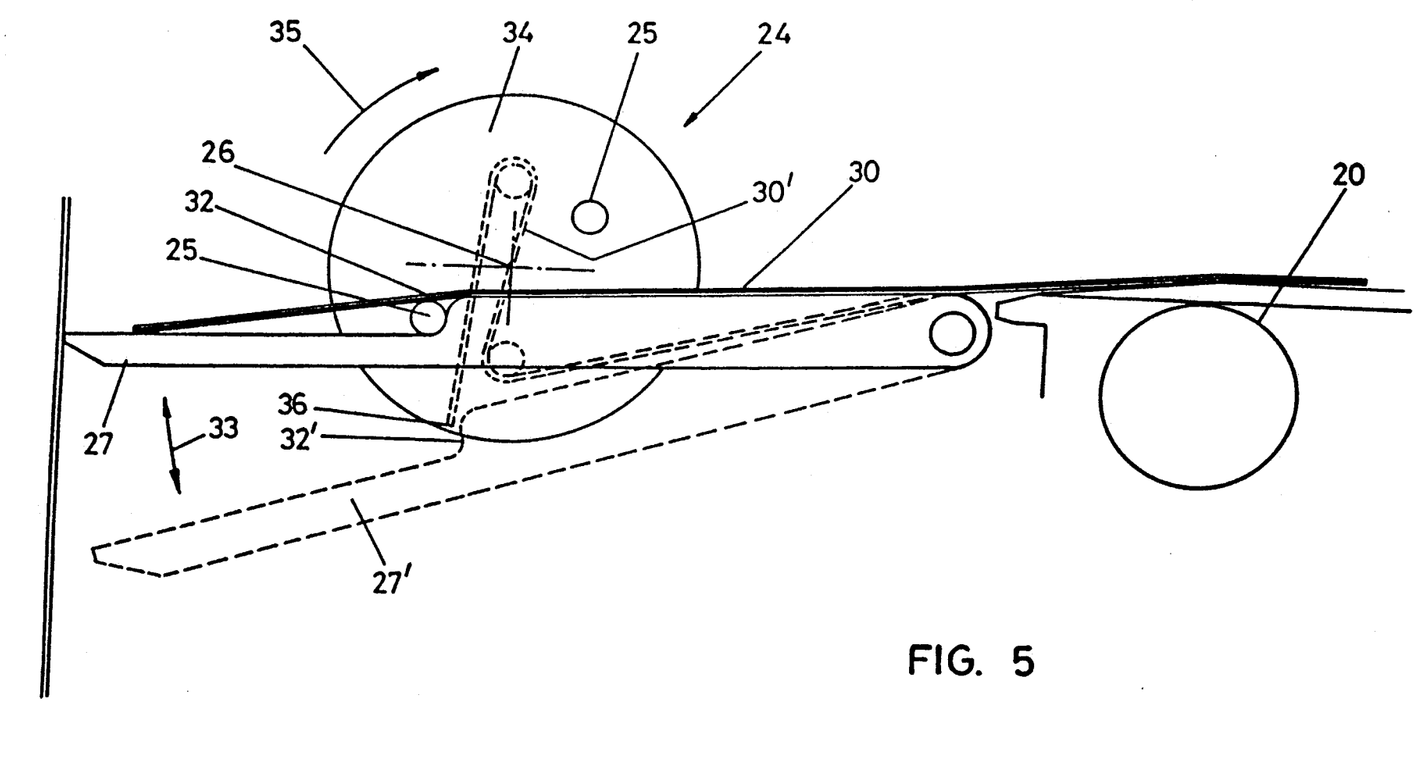
Figure 7:
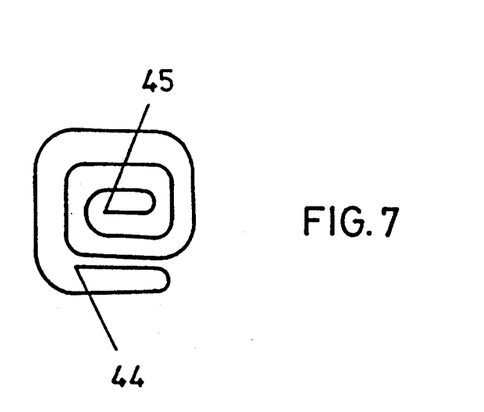
FIG. 7, a view in the direction of arrow VII of FIG. 6 of a finished, folded dough sheet or dough sheet packet.

Subsequently, the dough sheet is transferred to the rolling or tucking device shown in more detail in FIG. 5, and the fold lines defined by spindles 25 are indicated at 43 in dashed lines. By the rolling movement resulting from the pivoting of spindle 25, as was described above, now also the last, outer, exposed end 45 now reaches the interior of the projection of the folded dough sheet, as is clearly represented in the view according to FIG. 7. Here it is important that the end defined by exposed edge 45 is tucked at least twice, so that edge 45 comes to lie above tucked, first end 44. In the diagrammatic representation according to FIG. 7, the solid line here designates in each case the imaginary center line through the dough sheet already folded along fold lines 40 and 41.

As mentioned above, a dough sheet stack or dough sheet packet consisting of two or more superposed dough sheets can be folded in the way represented, and with superposed dough sheets there are no differences from the just-described method according to the representation of FIG. 6.

We claim:

1. A process for folding a substantially rectangular dough sheet having opposite side edges and first and second ends comprising the steps of:
   a) folding said dough sheet inward in opposite directions in at least two consecutive folding operations along parallel fold lines such that said opposite side edges of said dough sheet are parallel to said fold lines and come to lie within a projection of the folded dough sheet;

b) tucking said first end of said inwardly folded dough sheet along a line running crosswise to said parallel fold lines in a first tucking direction to form a first tucked end;

c) tucking said second end of said folded dough sheet at least twice in the direction of said parallel fold lines and opposite said first tucking direction so that a folded edge of said dough sheet comes to lie above said first tucked end.

2. Process according to claim 1, wherein said dough sheet is folded along said two parallel fold lines in opposite directions toward a center section.

3. Process according to claim 1, wherein said parallel fold lines lie at a distance from one another that is at least equal to distances between each of said parallel fold lines and respective closest ones of said opposite side edges.

4. A process according to claim 1, wherein the length of said tucked first end is smaller than or equal to the length of the twice tucked second end.

5. Process according to claim 1, wherein the folding of said dough sheet is performed with the insertion of a separating material.

6. Device for folding a substantially rectangular dough sheet having opposite side edges and first and second exposed ends comprising a first conveying device to transport said dough sheet; a first folding station attached to a second conveying device, said folding station having a pair of side edge folding flaps pivotable around a pair of pins parallel to a conveying direction; a third flap downstream of said first folding station and pivotable around a third pin running crosswise to said conveying direction for tucking said first exposed end; and a tucking device for tucking at least twice said second exposed end of said folded dough sheet, said tucking device attached to a third conveying device at a transfer point.

7. Device according to claim 6 wherein said tucking device is comprised of rods that can be driven to pivot around an axis of rotation running between and parallel to said rods.

8. Device according to claim 7, wherein said transfer point is located proximate the axis of rotation of said rods.

9. Device according to claim 6, and further comprising a grasping device for grasping a dough sheet which can be driven at a speed exceeding the conveying speed of said first conveying device.

10. Device according to claim 6, wherein said folding flaps have perforations formed therein.

11. Device according to claim 6, wherein a rod is placed proximate said third pin to move above the third conveying device crosswise to said conveying direction.

12. Device according to claim 6, wherein a pivotable blade-shaped element is located proximate said first folding station above said second conveying device, and wherein side edges of said blade-shaped element, in the projection on said second conveying device, are substantially aligned with said pair of pins of said pair of side edge folding flaps.

* * * * *